United States Patent [19]

Meszaros et al.

[11] Patent Number: 5,073,584

[45] Date of Patent: Dec. 17, 1991

[54] PROCESSING ADDITIVE FOR HALOGEN-CONTAINING POLYMERS

[75] Inventors: Peter Meszaros, Villach; Peter Stern, Arnoldstein, both of Austria

[73] Assignee: Chemson Polymer-Additive Gesellschaft m.b.H., Arnoldstein, Austria

[21] Appl. No.: 452,161

[22] Filed: Dec. 18, 1989

[30] Foreign Application Priority Data

Dec. 19, 1988 [AT] Austria ................................. 3088/88

[51] Int. Cl.⁵ ...................... C08K 34/92; C08K 5/15; C08K 5/04
[52] U.S. Cl. ................................... 524/101; 524/109; 524/400; 524/450
[58] Field of Search ................ 524/101, 109, 400, 450

[56] References Cited

FOREIGN PATENT DOCUMENTS

| | | |
|---|---|---|
| 2941596 | 4/1981 | Fed. Rep. of Germany . |
| 3113442 | 10/1982 | Fed. Rep. of Germany . |
| 3247737 | 7/1984 | Fed. Rep. of Germany . |
| 3332003 | 3/1985 | Fed. Rep. of Germany . |
| 2037777 | 7/1980 | United Kingdom . |
| 2037778 | 7/1980 | United Kingdom . |

OTHER PUBLICATIONS

*Chemical Abstract*, 89:7101e (1978), abstracting Japanese Patent 53-05,057.

*Primary Examiner*—Kriellion S. Morgan

*Attorney, Agent, or Firm*—Seidel, Gonda, Lavorgna & Monaco

[57] ABSTRACT

Proposed is a processing additive for halogen-containing polymers, in particular for polyvinyl chloride, with a content of a synthetic, crystalline, finely particulate alkali metal alumo silicate containing 13 to 25 percent by weight of bound water, which—in its anhydrous form—is of the composition $(0.7-1.1) Me_2O.Al_2O_3 \times (1.3-2.4) SiO_2$, Me standing for an alkali metal, wherein the alkali metal alumo silicate is present in combination with at least one isocyanuric acid derivative of the formula

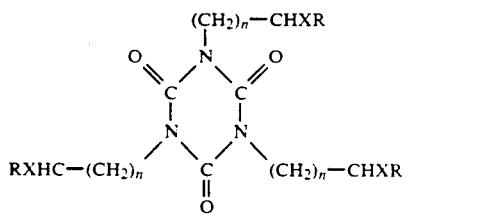

wherein each n stands for an integer from 0 to 5, preferably from 0 to 3, each X represents H or a straight or branched alkyl group having 1 to 6 carbon atoms, preferably 1 or 2 carbon atoms, and each R is —OH or —COOH, and wherein the n's, X's and/or R's preferably have the same meaning, as well as halogen-containing polymers stabilized with use of this combination.

19 Claims, No Drawings

PROCESSING ADDITIVE FOR HALOGEN-CONTAINING POLYMERS

The invention relates to a processing additive for halogen-containing polymers, in particular for polyvinyl chloride, with a content of a synthetic, crystalline, finely particulate alkali metal alumo silicate containing 13 to 25 percent by weight of bound water which—in its anhydrous form—is of the composition (0.7-1.1-)Me$_2$O.Al$_2$O$_3$×(1.3-2.4)SiO$_2$, Me standing for an alkali metal.

In other words, the invention relates to the stabilization of halogen-containing polymers, this term comprising homopolymerisates or copolymerisates of vinyl chloride as well as mixtures of such polymerisates with other polymeric masses. If it is not convenient to use lead, tin or barium/cadmium compounds for the stabilization, the soaps of alkali or alkaline earth metals or zinc in combination with various costabilizers are used instead. Among the costabilizers proposed up to now have been synthetic, crystalline, finely particulate alkali metal alumo silicate (zeolite) containing 13 to 25 percent by weight of bound water, which—in its anhydrous form—is of the composition (0.7-1.1) Me$_2$O.Al$_2$O$_3$×(1.3-2.4) SiO$_2$, Me standing for an alkali metal. Hereafter, this substance shall be referred to as alkali metal alumo silicate for simplicity's sake. This alkali metal alumo silicate is used with particular advantage in combination with certain further costabilizers, as taught by DE-OS 2941596, 3113442, 3247737 and 3332003.

It has now surprisingly been found that the combination of alkali metal alumo silicates with certain isocyanuric acid derivatives improves the color and thermal stability of halogen-containing polymers in an unforeseeable manner.

A processing additive according to the invention is thus mainly characterized in that the alkali metal alumo silicate is present in combination with at least one isocyanuric acid derivative of the formula

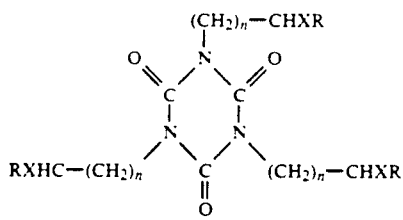

I wherein each n stands for an integer from 0 to 5, preferably from 0 to 3, each X represents H or a straight or branched alkyl group with 1 to 6 carbon atoms, preferably 1 to 2 carbon atoms and each R is —OH or —COOH and wherein the n's, X's and/or R's preferably have the same meaning. Preferred are isocyanuric acid derivatives of the formula I in which each X stands for H. Particularly preferred isocyanuric acid derivatives are tris-(2-hydroxyethyl)-isocyanurate (THEIC) and tris-(2-carboxyethyl)-isocyanurate (TCEIC). Although THEIC has been proposed in context with the stabilization of polyvinyl chloride (PVC) (see, e.g., GBPS 2037777 and 2037778 and JP-PS 7805057)), the particularly convenient combination with alkali metal alumo silicates has not been mentioned anywhere and was not obvious. The isocyanuric acid derivatives used according to the invention in combination with alkali metal alumo silicates are known compounds and can be produced according to known processes.

It is further preferred according to the invention to use the alkali metal alumo silicate and the isocyanuric acid derivative together with soaps of alkali metal —and/or alkaline earth metal —and zinc-soaps as primary stabilizers. The alkali metal alumo silicate/isocyanuric acid derivative combination according to the invention can further be used together with conventional lubricants, stabilizers with lubricating effect, further costabilizers and other conventional additives such as antioxidants, additives for improving impact strength, epoxides, plasticizers, pigments and/or fillers.

Suitable lubricants are metal soaps (such as calcium stearate or other salts of long-chained aliphatic carboxylic acids), waxes, long-chained alcohols, paraffins, fatty acids, fatty acid esters (for instance the esters or partial esters of polyols such as glycols, glycerol, penthaerythrite or sugar alcohols with fatty acids with 8 to 22 carbon atoms), or fatty acid amides.

The combination according to the invention can further conveniently be used together with epoxidized esters of unsaturated fatty acids, such as epoxidized soybean oil.

Of the antioxidants, sterically hindered phenols such as, for instance, 2,6-di-tertiary butyl-4-methyl phenol (BHT) have a particularly beneficial effect.

The processing additive according to the invention can be formulated in a conventional manner, among others as a powder; preferred is the form of granules, in particular compacted granules, structured granules or granules obtained via a plastic or liquid phase.

The invention further relates to halogen-containing polymers stabilized by means of the combination according to the invention, in particular polyvinyl chloride masses such as PVC homo or mixed polymerisates prepared in any given manner.

The polymers preferably contain the alkali metal alumo silicate in amounts of from 0.2 to 5 percent by weight and the isocyanuric acid derivative in amounts of from 0.1 to 5 percent by weight.

The invention is explained in the following by means of exemplary embodiments.

EXAMPLE 1

100 parts by weight of suspension PVC (K value 68) were mixed with the following components:
0.7 parts by weight (PW) calcium laurate;
0.6 parts by weight (PW) zinc laurate;
0.5 parts by weight (PW) synthetic paraffin (Fischer-Tropsch paraffin).

Added thereto were further components according to Table 1.

TABLE 1

| Batch No. | PW | Substance | Allocation |
|---|---|---|---|
| 1 | 1.0 | alkali metal alumo silicate | comparative example 1 |
| 2 | 1.0 | alkali metal alumo silicate | comparative example 1 |
|   | 0.2 | stearoyl benzoyl methane | comparative example 1 |
| 3 | 0.9 | alkali metal alumo silicate | comparative example 1 |
|   | 0.2 | stearoyl benzoyl methane | comparative example 1 |
|   | 0.1 | BHT | comparative example 1 |
| 4 | 1.0 | alkali metal alumo silicate | according to the |

TABLE 1-continued

| Batch No | PW | Substance | Allocation |
|---|---|---|---|
| | 0.4 | THEIC | according to the invention |
| 5 | 1.0 | alkali metal alumo silicate | according to the invention |
| | 0.4 | THEIC | according to the invention |
| | 0.1 | BHT | according to the invention |
| 6 | 0.9 | alkali metal alumo silicate | according to the invention |
| | 0.7 | THEIC | according to the invention |
| 7 | 0.9 | alkali metal alumo silicate | according to the invention |
| | 0.7 | THEIC | according to the invention |
| | 0.1 | BHT | according to the invention |
| 8 | 0.9 | alkali metal alumo silicate | according to the invention |
| | 0.7 | THEIC | according to the invention |
| | 0.1 | BHT | according to the invention |
| | 3.0 | epoxidized soybean oil | according to the invention |
| 9 | 0.9 | alkali metal alumo silicsate | according to the invention |
| | 0.2 | TCEIC | according to the invention |
| | 0.1 | BHT | according to the invention |
| 10 | 2.0 | alkali metal alumo silicate | according to the invention |
| | 0.4 | THEIC | according to the invention |

The effect of the stabilizer combinations is examined on the basis of the static thermal stability of rolled sheets. For this purpose, polyvinyl chloride molding masses containing the stabilizer mixtures were processed into test sheets on a laboratory rolling mill of the Collin Company with a roll diameter of 200 mm at a rolling temperature of 180° C. and a roll speed of 21 to 24 rpm within five minutes. The sheets of a thickness of about 0.3 mm were cut into strips of a width of about 15 mm and tested in a Mathis laboratory thermotester type LTF-ST. The time in minutes up to blackness (breakdown of stability) was assessed. The yellowness index was assessed after zero, 5 and 10 minutes, and every further 10 minutes.

The results are summarized in Table 2.

EXAMPLE 2

100 parts by weight of suspension PVC (K value 68) were mixed with the following components:
1.0 parts by weight (PW) calcium stearate;
0.8 parts by weight (PW) zinc stearate;
0.5 parts by weight (PW) synthetic paraffin (Fischer-Tropsch paraffin).

Added to these were further components according to Table 3.

TABLE 3

| Batch No | PW | Substance | Allocation |
|---|---|---|---|
| 11 | 2.0 | alkali metal alumo silicate | comparative example |
| 12 | 2.0 | alkali metal alumo silicate | comparative example |
| | 0.2 | stearoyl benzoyl methane | comparative example |
| 13 | 2.0 | alkali metal alumo silicate | according to the invention |
| | 1.0 | THEIC | according to the invention |
| 14 | 1.0 | alkali metal alumo silicate | according to the invention |
| | 1.0 | THEIC | according to the invention |
| 15 | 1.0 | alkali metal alumo silicate | according to the invention |
| | 1.0 | THEIC | according to the invention |
| | 0.1 | BHT | according to the invention |

The effect of the stabilizer combinations is examined like described in Example 1 on the basis of the static thermal stability of rolled sheets.

The results are summarized in Table 4.

TABLE 2

| Batch No. | Breakdown of Stability after Minutes | Yellowness Index after Minutes | | | | | | | | | | |
|---|---|---|---|---|---|---|---|---|---|---|---|---|
| | | 0 | 5 | 10 | 20 | 30 | 40 | 50 | 60 | 70 | 80 | 90 | 100 |
| 1 | 24 | 41.2 | 44.8 | 61.9 | 70.1 | | | | | | | | |
| 2 | 32 | 17.7 | 19.1 | 22.5 | 26.5 | 47.7 | | | | | | | |
| 3 | 35 | 17.4 | 18.4 | 23.5 | 32.1 | 43.0 | | | | | | | |
| 4 | 67 | 22.5 | 24.7 | 27.7 | 38.5 | 52.7 | 64.9 | 86.8 | 111.3 | | | | |
| 5 | 125 | 18.0 | 17.5 | 19.1 | 23.5 | 36.3 | 54.2 | 70.9 | 79.6 | 84.7 | 93.8 | 99.9 | 109.4 |
| 6 | 83 | 18.3 | 18.8 | 20.1 | 25.2 | 35.1 | 47.9 | 62.9 | 79.2 | 106.5 | — | — | — |
| 7 | 120 | 18.6 | 19.3 | 20.7 | 24.3 | 33.7 | 48.2 | 61.0 | 67.6 | 72.7 | 80.1 | 88.2 | 104.2 |
| 8 | 132 | 14.7 | 19.7 | 20.4 | 23.9 | 33.6 | 48.2 | 53.0 | 60.7 | 63.5 | 65.8 | 70.9 | 73.7 |
| 9 | 118 | 19.1 | 20.0 | 23.5 | 30.5 | 41.2 | 55.1 | 68.0 | 80.8 | 85.7 | 89.4 | 98.8 | 107.7 |
| 10 | 100 | 21.2 | 23.1 | 26.4 | 36.3 | 50.3 | 60.3 | 72.3 | 96.5 | 114.9 | | | |

TABLE 4

| Batch No. | Breakdown of Stability after Minutes | Yellowness Index after Minutes | | | | | | | | | | |
|---|---|---|---|---|---|---|---|---|---|---|---|---|
| | | 0 | 5 | 10 | 20 | 30 | 40 | 50 | 60 | 70 | 80 | 90 | 100 |
| 11 | 40 | 45.9 | 45.9 | 61.5 | 85.0 | 84.3 | | | | | | | |
| 12 | 38 | 22.7 | 22.8 | 28.5 | 36.8 | 45.2 | | | | | | | |
| 13 | 110 | 18.6 | 18.0 | 19.4 | 23.2 | 32.4 | 46.3 | 60.0 | 82.2 | 101.5 | 117.2 | 130.0 | |
| 14 | 87 | 19.5 | 18.6 | 18.9 | 24.0 | 37.2 | 49.0 | 66.4 | 86.9 | 109.1 | 123.0 | | |
| 15 | 98 | 21.7 | 21.9 | 26.1 | 33.3 | 49.1 | 59.5 | 69.6 | 73.3 | 80.1 | 99.4 | 114.5 | |

We claim:
1. A process additive for halogen-containing polymers comprising the combination of a synthetic, crystalline finely-particulate alkali metal aluminosilicate of the formula $(0.7-1.1)\,Me_2O\cdot Al_2O_3\times(1.3-2.4)SiO_2$ containing 13 to 25 percent by weight of bound water, wherein Me is an alkali metal, and at least one isocyanuric derivative of the formula

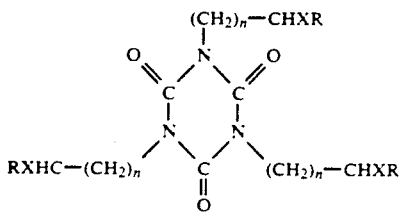

wherein
  each n is independently an integer from 0 to 5,
  each X is independently H or a straight or branched alkyl group containing 1 to 6 carbon atoms, and
  each R is independently —OH or —COOH.

2. The processing additive according to claim 1 wherein each n of the isocyanuric acid derivative is independently an integer from 0 to 3.

3. The processing additive according to claim 1 wherein each X of the isocyanuric derivative is independently H or a straigth or branched alkyl group containing 1 or 2 carbon atoms.

4. The processing additive according to claim 1 wherein each n of the isocyanuric derivative has the same meaning, each X has the same meaning, and each R has the same meaning.

5. The processing additive according to claim 1 wherein each X is H in the isocyanuric acid derivative.

6. The processing additive according to claim 5 wherein the isocyanuric acid derivative is tris-(2-hydroxyethyl)-isocyanurate or tris-(2-carboxyethyl)-isocyanurate.

7. The processing additive according to claim 1 further comprising at least on metal soap as a primary stabilizer.

8. The processing additive according to claim 7 wherein the metal soap is selected from the group of metal soaps of Ba, Ca, Mg, Zn, and combinations thereof.

9. The processing additive according to claim 1 further comprising barium alkylphenolate as a primary stabilizer.

10. The processing additive according to claim 1 further comprising a lubricant.

11. The processing additive according to claim 1 further comprising epoxidized soybean oil.

12. The processing additive according to claim 1 further comprising a sterically hindered phenol.

13. A halogen-containing polymer stabilized by combination with a processing additive according to claim 1.

14. A stabilized halogen-containing polymer according to claim 13 wherein the polymer comprises polyvinyl chloride.

15. A stabilized halogen-containing polymer according to claim 13 wherein the alkali metal alumino-silicate comprises 0.2 to 5 percent by weight of the stabilized polymer.

16. A stabilized halogen-containing polymer according to claim 14 wherein the alkali metal alumino-silicate comprises 0.2 to 5 percent by weight of the stabilized polymer.

17. A stabilized halogen-containing polymer according to claim 13 wherein the isocyanuric acid derivative comprises 0.2 to 5 percent by weight of the stabilized polymer.

18. A stabilized halogen-containing polymer according to claim 14 wherein the isocyanuric acid derivative comprises 0.2 to 5 percent by weight of the stabilized polymer.

19. A stabilized halogen-containing polymer according to claim 15 wherein the isocyanuric acid derivative comprises 0.2 to 5 percent by weight of the stabilized polymer.

* * * * *